United States Patent
Blaauw

[15] 3,680,880
[45] Aug. 1, 1972

[54] IMPLEMENT MOUNTING AND LIFT ARRANGEMENT

[72] Inventor: Andrew Blaauw, Winneconne, Wis.

[73] Assignee: J. I. Case Company, Racine, Wis.

[22] Filed: June 8, 1970

[21] Appl. No.: 44,238

[52] U.S. Cl.....280/43.17, 56/DIG. 22, 214/DIG. 10, 280/43
[51] Int. Cl. ............................................. B60s 9/00
[58] Field of Search......280/43, 43.11, 43.17, 6, 150, 280/150 F; 56/DIG. 22; 214/DIG. 10

[56] References Cited

UNITED STATES PATENTS

| | | | |
|---|---|---|---|
| 3,483,684 | 12/1969 | Price | 56/13.6 |
| 3,421,776 | 1/1969 | McCoy et al. | 280/43.17 |
| 2,928,223 | 3/1960 | Danuser | 56/13.6 |
| 3,283,486 | 11/1966 | Marek et al. | 56/16.3 |

Primary Examiner—Benjamin Hersh
Assistant Examiner—Winston H. Douglas
Attorney—Cullen, Settle, Sloman & Cantor

[57] ABSTRACT

A mounting arrangement for an implement carried by a vehicle underneath the vehicle body, includes a four-point linkage arranged such as to form a parallelogram so as to maintain the implement in a parallel, nominally horizontal, posture at any vertically adjusted position of the implement.

10 Claims, 3 Drawing Figures

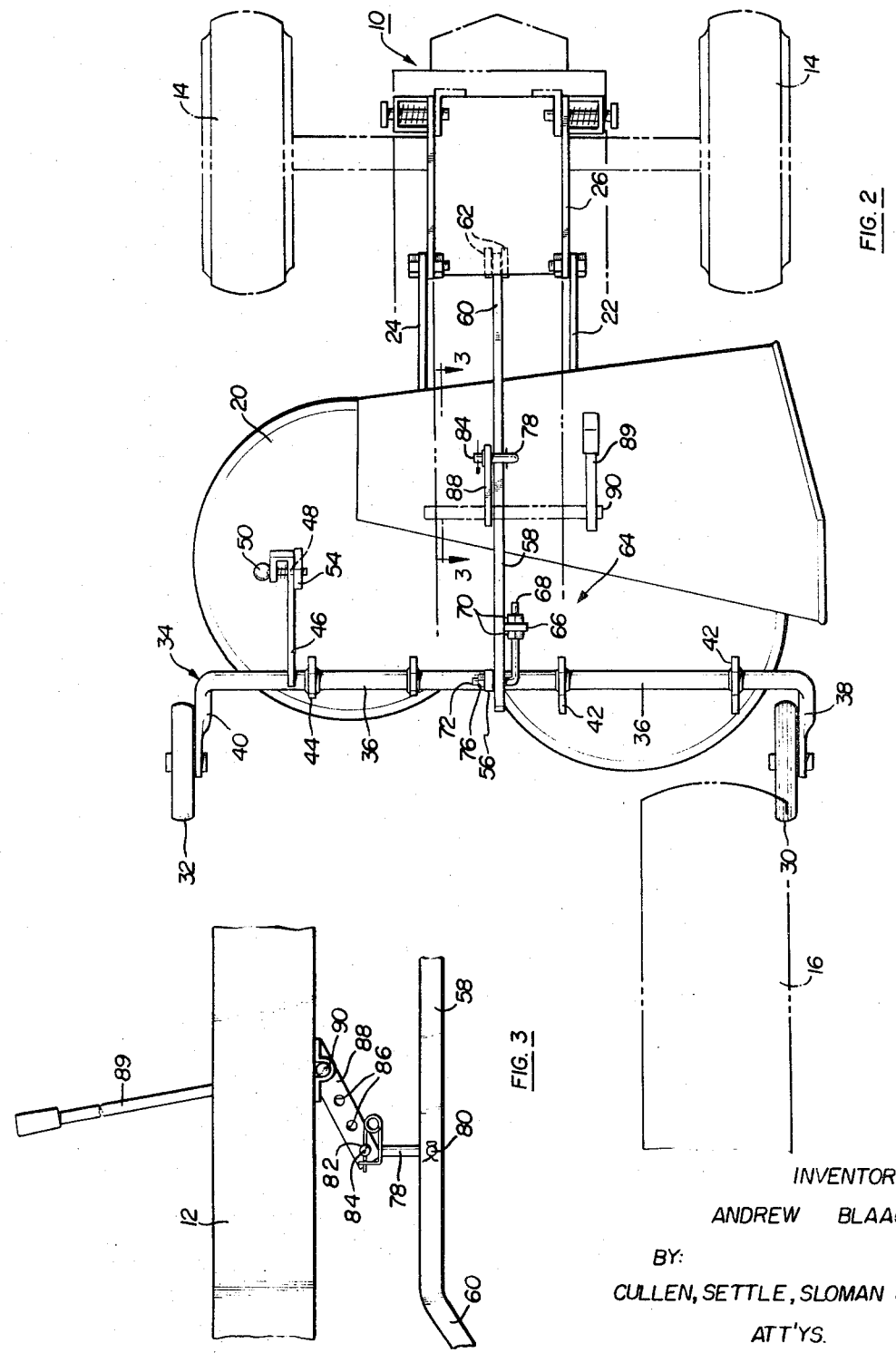

IMPLEMENT MOUNTING AND LIFT ARRANGEMENT

BACKGROUND OF THE INVENTION

The present invention relates to vehicle carried implements such as a mower or the like which are carried underneath the vehicle body such as a tractor and relates more in particularly to a support and lifting arrangement for mounting the implement to the vehicle body.

In the operation of implements, such as rotary type mowers, carried by a vehicle, such as a tractor, it is often desired to raise or lower the mower unit relative to the tractor frame so as to accommodate for different desired cutting lengths of the grass. Such raising and lowering typically accomplished by adjustment of ground riding gauge wheels carried by the implement. It is further desired to raise the implement, including the gauge wheels, above the ground for travel of the vehicle to another location.

These adjustments, to the proper lever for operation of the implement and for transporting to the implement to another location, are relatively easily accomplished by a proper lever lift linkage attached to the implement and operable by the operator of the vehicle.

Aside from the above desired cutting height adjustment of the implement, which can be accomplished by conventional means, a serious problem exists in retaining the implement parallel to the ground as the implement rides over the ground to prevent scalping or skinning of the ground surface. It is known that implements such as rotary mowers carried underneath a tractor body by a lift linkage and draw bar tend to tilt to one side or the other relative to the ground, tending to scalp the ground surface. This is an undersired side effect of such type of implements, which not only damage the ground surface on which the implement is working but also damage the operating mechanism of the implement itself.

Various mechanisms comprising multiple lever arrangements have been proposed to maintain the implement parallel relative to the ground surface, however, such arrangements are complicated and costly and must be actuated by the operator of the vehicle. Furthermore, in implements mounted underneath the vehicle body there is usually very little clearance between the vehicle body and the implement, which precludes the use of a complicated lever linkage arrangement suitable to take the draft forces, and at the same time provide for proper geometry to keep the implement level so it will be useful in all positions.

SUMMARY OF THE INVENTION

The present invention provides a four-point linkage arrangement for mounting an implement underneath a vehicle body. The implement is pivotally connected to the draw bar of the vehicle forwardly of the implement forming one point of the four-point linkage and is supported rearwardly by a pair of adjustable gauge wheels which pivot around a transverse axis, forming a second point of the four-point linkage. A lift bar extends across the implement from the front towards the rear and is connected at the front to the draw bar by means of a link forming a third point of the four-point linkage and at the rear to the pivot axis of the gauge wheels by means of another link forming a fourth point of the four-point linkage. The four points of the linkage form a parallelogram of forces such that under operating conditions of the vehicle causing articulate movement of the mower over the ground the implement will follow the ground contour and maintain the proper cutting height. The lift bar of the implement is connected by a link to a rotatable lift lever carried on the vehicle body which is operable by the operator of the vehicle to lift the implement above the ground when moving the vehicle from one location to another.

Further advantages of the present invention and the novel features thereof will become more readily apparent by reference to the following detailed description in connection with the appended drawings.

BRIEF DESCRIPTION OF THE DRAWINGS

The appended drawings illustrate a preferred embodiment of the invention, in which:

FIG. 2 is a top plan view of the arrangement shown in FIG. 1; and

FIG. 3 is a sectional view of the attachment of the linkage to the vehicle body.

DESCRIPTION OF THE PREFERRED EMBODIMENT

Figure 1:
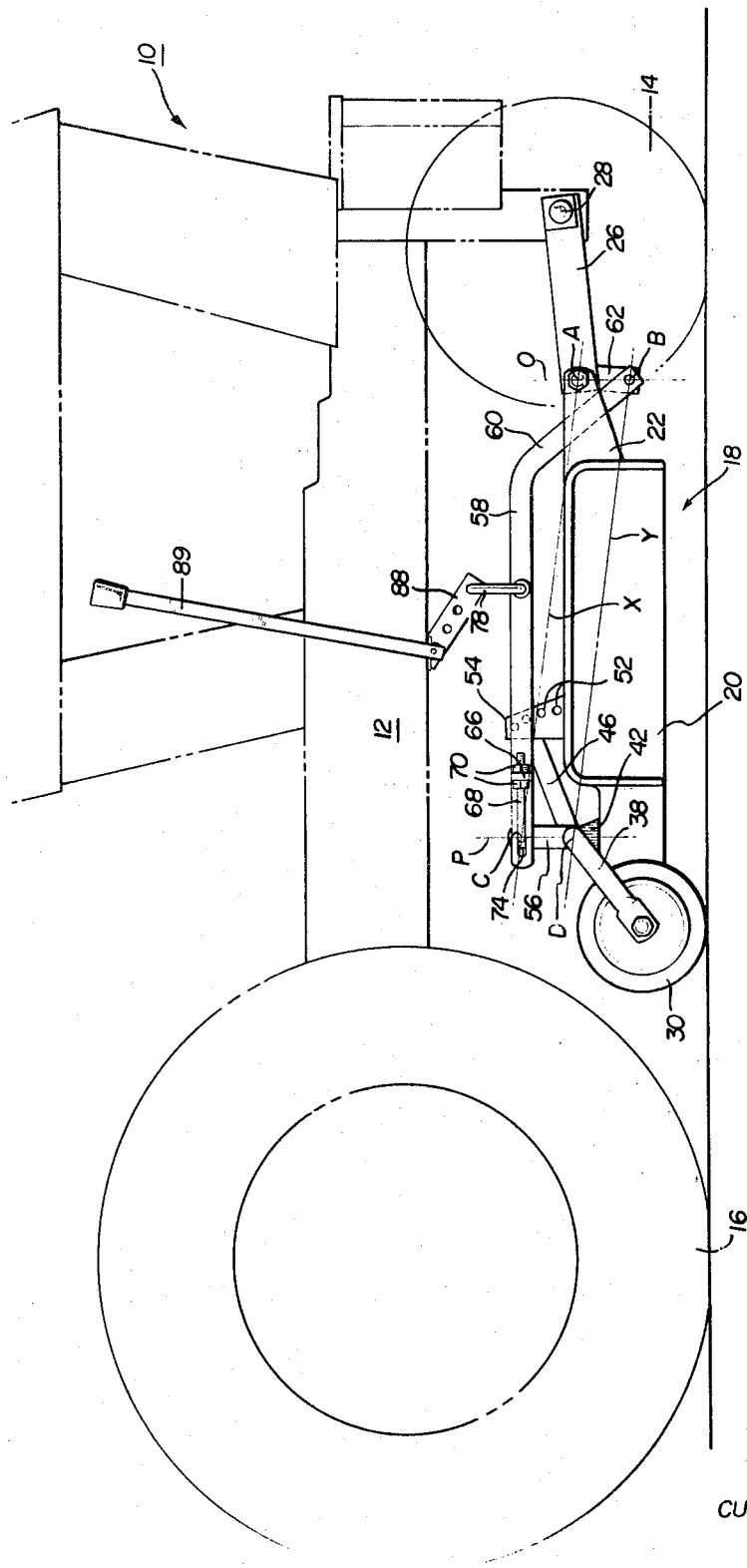
FIG. 1 is a side view of a tractor vehicle carrying an implement underneath the vehicle body embodying the present invention.

In FIG. 1 is illustrated a vehicle such as a tractor 10, here being shown as of the small garden-type, having a vehicle body or chassis 12 and ground engaging front wheels 14 and rear wheels 16. Mounted underneath the tractor body 12 between the front wheels 14 and rear wheels 16 is an implement 18 illustrated here to be a rotary mower.

With further reference to FIG. 2, the implement 18 is supported within a housing or deck 20 extending transversely of the vehicle body 12. The front end of the housing 20 is provided with a pair of spaced forwardly extending brackets 22 and 24 secured to the housing by any known means. The brackets 22 and 24 provide a hitch and for this purpose receive the end of a draw bar member 26 by a pivot connection designated A and the other end of the draw bar 26 is pivotally attached at 28 to the body 12 of the tractor.

Rearwardly, the housing 20 of the implement is supported on the ground by a pair of spaced gauge wheels 30 and 32 which are supported for rotation on transversely extending stub ends of a crank axle 34 comprising a transverse axle portion 36 which extends at both ends into arm portions 38 and 40, respectively, on which the wheels 30 and 32 are supported.

The transverse axle portion 36 of the gauge wheels 30 and 32 extends across the rear end of the housing 20 and is supported for rotation within spaced brackets 42 and 44, respectively. At one end of the axle 36 a bracket 46 is welded on which extends forwardly over the housing 20 and is provided at its end with an aperture 48 for extension of a latch pin 50 therethrough. The latch pin 50 is adapted to be engaged in a selected aperture of a plurality of apertures 52 provided along an upwardly extending bracket 54 which is secured to the deck of the housing 20. By this arrangement, height adjustment for the gauge wheels 30 and 32 is provided by rotating the axle 36 within the brackets 42 and 44 and engaging the latch pin 50 in a selected aperture 52 and through the aperture 48 of the axle bracket 56, thus, lowering or raising the housing 20 of the implement relative to the ground to obtain the desired cutting height for the mover.

Intermediate the axle support brackets 42 and 44, another bracket 56 has been provided welded on to the axle and positioned substantially centrally of the housing 20 and extending therefrom upwardly. The bracket 56 provides a link in the linkage mechanism and has its upper end connected by means of a pivot connection indicated as C to the rear end of the lift bar 58. The lift bar 58 is positioned along the center of the housing 20 and extends across the deck of the housing forwardly towards the draw bar 26. At the forward end of the housing 20, the lift bar 58 inclines downwardly at 60 for extension between the hitch brackets 22 and 24 at the forward end of the housing 20. The front end 60 of the lift bar 58 is pivotally attached by means of a pivot connection indicated at B to a downwardly extending link 62 which is secured to the draw bar 26 of the tractor.

At the rear end of the lift bar 58 fore and aft adjustment generally indicated at 64 has been provided which comprises a bracket 66 extending laterally from one side of the lift bar 58. A screw rod 68 extends through an aperture in the bracket 66 for extension along side the lift bar 58 towards the rear. Adjusting nuts 70 are provided on the screw rod 68 on both sides of the bracket 66 for adjustment of the screw rod lengthwise along the lift bar 58. The screw rod 68 is shaped in the form of an L to provide an angled portion 72 which is adapted to extend through a slot 74 provided at the rear end of the lift bar 58 as seen in FIG. 4. The end of the L portion 72 of the bracket 68 extends further through the aperture provided at the upper end of the link 56 for securement thereto by means of a nut 76. The angle portion 72 of the screw rod 68 attaches the lift bar 58 to the link 56 and provides the pivot point C of the linkage arrangement. Upon respective adjustment by means of adjusting nuts 70 the lift bar 58 will be moved forward or rearwardly by means of the provision of the slot 74 to center the lift bar relative to the lift linkage now to be described.

The lift linkage comprises a U-bolt 78 having a lower arm 80 for extension through an aperture 82 provided in the lift bar 58 intermediate the ends thereof. The upper arm 84 of the U-bolt 78 is adapted for extension and securement within a selected one of a plurality of apertures 86 provided in a lever 88 which is pivoted at 90 to the vehicle body 12. An appropriate conventional control 89 is provided on the vehicle and attached to the lift lever 88 for manipulation by the operator of the vehicle to pivot the lever 88 around its pivot 90 in order to raise the implement 18 for transport of the vehicle to another location or to lower the implement 18 towards the ground for work operation.

DESCRIPTION OF THE FOUR-POINT LINKAGE

The gauge wheel axle 36 forms the fourth pivot point designated D and it will be noted from FIG. 1 that a line O drawn through the center of the front pivot points A and B is parallel with a line designated P drawn through the center of the rear pivot points C and D. Conversely, a line X drawn through the center of the upper pivot points A and C, is parallel with a line Y drawn through the center of the lower pivot points A and D. Thus, the four pivot points A, B, C and D form a parallelogram adapted, upon articulate movement of the linkage, to maintain the implement 18 in a level position or substantially level position relative to the ground at any height position at which the implement may be disposed.

In operation of the present improved implement support arrangement, after obtaining the desired height adjustment at 46, 50 and 54, the implement 20 is constantly maintained at that adjusted height relative to the vehicle body 12 by means of the solid connection through the height adjustment 46, 50 and 54, to cause the implement to act as a solid unit, pivoting around the front pivot 28.

During height adjustment, the parallelogram linkage above described at all times maintain the implement 20 level relative to the ground.

In operation of the tractor 10, the implement 20 is guided over the ground by the tractor wheels 14, 16 and the implement gauge wheels 30.

It is apparent from the foregoing description that the present invention provides an improved support and height adjustment linkage by the provision of a four-point parallelogram linkage. It will be noted that the present improved linkage arrangement requires no more space underneath the vehicle body than any other conventional supporting linkage.

The linkage of the present invention is inexpensive and the implement, together with the linkage, can be easily assembled and disassembled from the tractor by disconnection of the front pivot points A and B from the draw bar 26 of the tractor and disconnection of the lift bar 58 from the lift link 78 or, if preferred, lift link 78 may be disconnected from the lift lever 88.

Pivot point B preferably is a spring loaded pin for easy disconnection of the lift bar 58 so that the lift bar can be rotated over the implement at point A to shorten the overall length of the assembly to facilitate sliding of the assembly between the front and rear wheels 14, 16.

The present improved implement support linkage permits easy height and fore and aft adjustment which, once being made, will be maintained. The linkage itself comprising the draw bar 58 and links 56 and 62 requires no adjustment and no lost motion connection between its members so that the parallelogram arrangement will always be maintained at any height adjustment.

Although the present invention has been described in connection with only one preferred embodiment, it is obvious that various modifications may be made therein without departing from the spirit and essential characteristic of the invention and such modification is contemplated to be included within the scope of the appended claims which follow.

What is claimed is:

1. In a mounting arrangement for an implement underneath a tractor having a body and ground-engaging wheels, a draw bar means pivotally secured to said body at one end, the other end of said draw bar means being pivotally secured to said implement at a first pivot point; a first link disposed forwardly of said implement and pivotally connected to said first pivot point; a lift bar having one end pivotally connected to the other end of said first link at a second pivot point and having its other end pivotally connected to one end of a second link at a third pivot point rearwardly of said implement, the other end of said second link being pivotally connected to said implement at the rear thereof and defining a fourth pivot point spaced a distance corresponding to the distance between said first and second pivot point; said pivot points at said first and said second link being in planes parallel to each other; said first and said third pivot point being located in a plane parallel to a plane containing said second and said fourth pivot point; to thereby provide a parallelogram support for said implement to maintain said implement substantially parallel when adjusted for height to the plane of the ground traversed by the vehicle and, means disposed substantially at the center of said lift bar for attachment to a selectively operable lift lever disposed on said tractor to lift said implement above said ground.

2. In the mounting arrangement as defined in claim 1, said implement being supported on the ground by a pair of gauge wheels having an axle extending transversely above the rear of said implement and forming said fourth pivot point, said second link extending from said axle and said first link forming an extension extending from said draw bar means.

3. In the mounting arrangement as defined in claim 2, said axle being provided with an arm extending forwardly therefrom, a height adjustment bracket secured to said implement provided with a plurality of apertures, a latch pin adapted to be selectively engaged in one of said apertures to secure said arm to said bracket in a selected adjusted position to thereby raise or lower said implement relative to the ground.

4. In the mounting arrangement as defined in claim 1, further comprising adjustable connecting means provided between said lift bar and said vehicle body and operable to lift said implement and gauge wheels off the ground.

5. In the combination with a vehicle having a body and ground-engaging wheels, an implement adapted to be mounted on said vehicle underneath said vehicle body, said implement having a pair of gauge wheels adjustably supported on said implement rearwardly thereof and pivotable about a substantially horizontal axis extending tranversely of said vehicle body, a draw bar means pivotally connected to said body forwardly of said implement, hitch means pivotably connecting said draw bar means with said implement and a linkage system including four pivotal axes defining a parallelogram support for said implement, said hitch means comprising brackets secured to said implement and extending forwardly therefrom and pivotally connected to said draw bar means, said pivotal connection forming a first pivot axis, said linkage system including a lift bar extending across said implement from the front toward the rear and pivotally connected forwardly of said implement to said draw bar means by a first link means located at a point below said first pivot axis, said pivotal connection forming a second pivot axis, said lift bar also being pivotally connected to said horizontal axis rearwardly of said implement by a second link means located at a point above said horizontal axis defining a third pivot axis and, said horizontal axis defining a fourth pivot axis, said first, second, third and fourth pivot axes defining said parallelogram support and a height adjustment connected to said linkage system adapted to maintain said implement together with said gauge wheels in a level position relative to the ground.

6. In combination as defined in claim 5, said first and second pivot axes being located in a plane parallel to a plane containing said third and fourth pivot axes.

7. In the combination as defined in claim 5, said lift bar having means for adjustably connecting said lift bar to said vehicle body at a point intermediate its ends and means to raise said implement above the ground.

8. In the combination as defined in claim 5, the further provision of a height adjustment mechanism providing a bracket attached to the implement and extending upwardly therefrom, said bracket provided with a plurality of apertures, a link connected to said gauge wheels having an aperture at its end thereof adapted to be directly aligned with a selected one of the plurality of apertures in said bracket and, a latch pin securing said link to said bracket at said selected aperture.

9. In the mounting arrangement as defined in claim 5, said lift bar extending longitudinally of said body substantially along the center of said implement.

10. A mechanism for disposing an implement below the longitudinally extending body of a motor vehicle, said implement being disposed underneath the body of said vehicle and movable up and down relative to said vehicle body, said mechanism comprising: a combination of a pair of link members extending between said implement and said tractor body at locations forwardly and rearwardly of said implement, a pair of gauge wheels supporting said implement on said ground and being adjustable in height around an axis extending transversely of said vehicle body across the rear of said implement, a draw bar means forwardly of said implement pivotally connecting said implement with said vehicle body, a lift bar extending above said implement in longitudinal direction of said vehicle body, the forward link of said pair of links being pivotally connected between said draw bar means and one end of said lift bar, the rearward link of said pair of links being pivotally connected on said axis of said gauge wheels and to the other end of said lift bar, said pivotal connections of said pair of links forming a parallelogram to maintain said implement level at any adjusted height position.

* * * * *